United States Patent
Inha et al.

(10) Patent No.: US 12,518,451 B2
(45) Date of Patent: Jan. 6, 2026

(54) APPARATUS AND METHOD OF IMAGE PROCESSING TO ENHANCE TEXTUAL FEATURES IN OUTPUT IMAGE

(71) Applicant: Varjo Technologies Oy, Helsinki (FI)

(72) Inventors: Kai Inha, Helsinki (FI); Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 161 days.

(21) Appl. No.: 18/516,214

(22) Filed: Nov. 21, 2023

(65) Prior Publication Data

US 2025/0166258 A1   May 22, 2025

(51) Int. Cl.
| | | |
|---|---|---|
| *G06T 11/00* | (2006.01) | |
| *G06T 11/60* | (2006.01) | |
| *G06V 10/82* | (2022.01) | |
| *G06V 30/10* | (2022.01) | |

(52) U.S. Cl.
CPC .............. *G06T 11/60* (2013.01); *G06V 10/82* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 9,098,888 B1 * | 8/2015 | Lin | G06V 30/413 |
| 9,424,598 B1 * | 8/2016 | Kraft | H04W 4/025 |
| 9,430,766 B1 * | 8/2016 | Kraft | G06N 3/08 |
| 2020/0151503 A1 * | 5/2020 | Wang | G06F 18/214 |

OTHER PUBLICATIONS

European Patent Office, Extended European Search Report, Application No. 24208669.2, Mailed Mar. 12, 2025, 8 pages.
Harizi et al, 'Deep-learning based end-to-end system for text reading in the wild', Multimedia Tools and Applications, Kluwer Academic Publishers, vol. 81, No. 17, XP037880216, ISSN: 1380-7501, DOI: 10.1007/S11042-022-11998-X, Mar. 21, 2022, 29 pages.
Li et al, "Text Recognition in Natural Scenes: A Review", 2020 International Conference on Culture-Oriented Science & Technology (ICCST), XP033863504, DOI: 10.1109/ICCST50977.2020. 00036, Oct. 28, 2020, 6 pages.
Yuhang et al, Designing and Evaluating a Customizable Head-mounted Vision Enhancement System for People with Low Vision, ACM Transactions on Accessible Computing (TACCESS), vol. 12, No. 4, XP058445672, ISSN: 1936-7225, DOI: 10.1145/3361866, Dec. 16, 2019, 46 pages.

* cited by examiner

*Primary Examiner* — Martin Mushambo
(74) *Attorney, Agent, or Firm* — Ziegler IP Law Group, LLC

(57) ABSTRACT

Disclosed is an apparatus including an image sensor to capture an input image with one or more textual features. The one or more textual features are present in an unreadable or distorted form. Further, the apparatus includes a processor configured to detect the one or more textual features of the input image and execute a neural network to concurrently deduce a plurality of glyphs that form one or more relevant words or abbreviations based on the detected one or more textual features of the input image. Further, the processor is configured to generate an output image with enhanced one or more textual features in a legible form based on the deduced plurality of glyphs.

13 Claims, 3 Drawing Sheets

APPARATUS AND METHOD OF IMAGE PROCESSING TO ENHANCE TEXTUAL FEATURES IN OUTPUT IMAGE

TECHNICAL FIELD

The present disclosure relates to an image processing apparatus incorporating enhancement of textual features in an output image. Moreover, the present disclosure relates to a method of image processing incorporating enhancement of textual features in an output image.

BACKGROUND

Nowadays, neural networks have emerged as a powerful tool for various applications, including the segmentation, detection and prediction of a textual content. The advancement of neural networks in this field is primarily attributed to vast and ever-increasing amount of data available on internet and social media platforms. The abundance of data has proven to be invaluable for training the neural networks and enabling the neural networks to excel in tasks related to text analysis and interpretation. Consequently, the neural networks manifest the ability to work with a wide range of writing systems and languages, such as Latin script, Chinese characters, or any other character set in the world. Moreover, the neural networks can also deduce semantic information from the textual data, such as determining the current phase of a training session, which could be relevant in educational and professional training scenarios.

However, despite such effectiveness of the neural networks, there are technical issues when it comes to display of the textual data in Extended Reality (XR) headsets. The XR headsets exhibits numerous limitations, including constraints in optics, hardware capabilities, frame rates, and variations in lighting and user movements. The aforementioned limitations result in less than perfect resolution and clarity when reading textual information.

Currently, certain attempts have been made for displaying of the textual content in the XR headsets at high resolution, such as by making high quality hardware and software which is cost intensive and less feasible. Thus, there exists a technical problem of displaying the textual content in immersive environments at low resolution.

Therefore, in light of the foregoing discussion, there exists a need to overcome the aforementioned drawbacks associated with the conventional ways of displaying the textual content in the XR headsets.

SUMMARY

The aim of the present disclosure is to provide an apparatus and a method of image processing that enhances the display of textual content in XR headsets. The aim of the present disclosure is achieved by an apparatus and a method of image processing that enhances the display of textual content in XR headsets as defined in the appended independent claims to which reference is made to. Advantageous features are set out in the appended dependent claims.

Embodiments of the present disclosure substantially eliminate or at least partially address the aforementioned problems in the prior art, and enable generation of an output image with enhanced textual features which are initially present in an obscured form in an input image due to either low resolution or noise.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
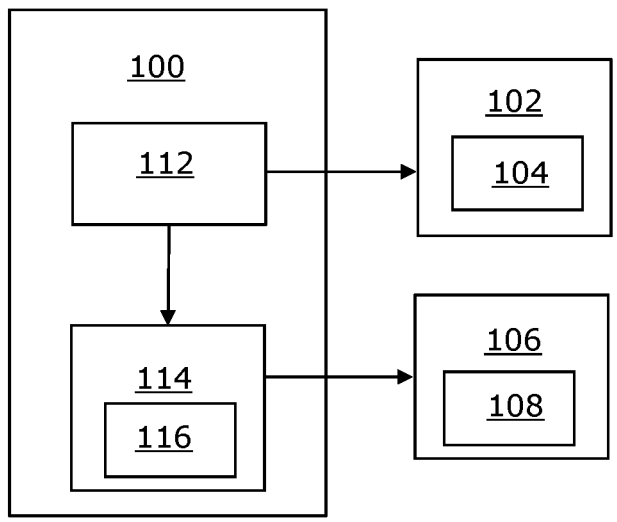
FIG. 1 is an illustration of a block diagram of an apparatus of image processing to enhance textual features in an output image, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an apparatus, comprising:
  an image sensor to capture an input image with one or more textual features, wherein the one or more textual features are present in an unreadable or distorted form; and
  a processor configured to:
    detect the one or more textual features of the input image;
    execute a neural network to concurrently deduce a plurality of glyphs that form one or more relevant words or abbreviations based on the detected one or more textual features of the input image; and
    generate an output image with enhanced one or more textual features in a legible form based on the deduced plurality of glyphs.

In a second aspect, the present disclosure provides a method of image processing implemented in at least one apparatus, the method comprising:
  capturing an input image with one or more textual features, wherein the one or more textual features are present in an unreadable or distorted form;
  detecting the one or more textual features of the input image;
  executing a neural network to concurrently deduce a plurality of glyphs that form one or more relevant words or abbreviations based on the detected one or more textual features of the input image; and
  generating an output image with enhanced one or more textual features in a legible form based on the deduced plurality of glyphs.

The present disclosure provides the aforementioned apparatus and the aforementioned method to enhance textual features in an output image. The textual features are enhanced up to an extent that the textual features are now present in a legible form in the output image. The aforementioned apparatus and the aforementioned method leverage prowess of the neural network to predict or deduce textual markings and information within XR headsets. Moreover, the aforementioned apparatus and the aforementioned method present an approach to restore or synthesize missing data based on predictive capability of the neural network. The aforementioned apparatus and the aforementioned method enhance the quality of textual information display in XR headsets, particularly when dealing with images which have resolution either at or below an optical resolution limit or suffer from blurriness caused by factors, such as long exposure, noise or motion blur. The aforementioned apparatus and the aforementioned method can be applied to achieve "super-human vision" that is the ability of a user or viewer to see features (e.g., textual) through a video-see-through (VST) camera sensor via contrast enhancement, that is not visible through naked eye. Moreover, the aforementioned apparatus and the aforementioned method can be used to reconstruct known words and phrases with efficacy in comparison to random strings of letters. Additionally, the use of the aforementioned apparatus and the aforementioned method reduces power consumption and enables an improved user experience in form of an increased resolution of the output image, especially in challenging viewing conditions. The aforementioned apparatus and method offer a reduced power consumption and provides an enhanced user experience in form of increased resolution, especially in challenging viewing conditions.

Throughout the present disclosure, the term "apparatus" refers to a specialized equipment that is configured to present an extended-reality (XR) environment to a user. In operation, the apparatus is worn by the user on his/her head. In such an instance, the apparatus acts as a device (for example, an XR headset, a pair of XR glasses, and the like) that is operable to present a visual scene of the XR environment to the user. Commonly, the "apparatus" is referred to as a "head-mounted display apparatus", for the sake of convenience only. Throughout the present disclosure, the term "extended-reality" encompasses virtual reality (VR), augmented reality (AR), mixed reality (MR), and the like.

The apparatus comprises an image sensor to capture an input image with one or more textual features, wherein the one or more textual features are present in an unreadable or distorted form. The term "image sensor" refers to a device, which detects light from the real-world environment at its photo-sensitive surface, when said light is incident thereupon. The image sensor comprises a plurality of photo-sensitive elements, which collectively form the photo-sensitive surface of the image sensor. Upon such detection of the light from the real-world environment, the plurality of photo-sensitive elements captures a plurality of image signals. The plurality of image signals are electrical signals pertaining to a real-world scene of the real-world environment. It will be appreciated that the "plurality of photo-sensitive elements" could be arranged in a required manner (for example, such as a rectangular two-dimensional (2D) grid, a polygonal arrangement, a circular arrangement, an elliptical arrangement, a freeform arrangement, and the like) to form the photo-sensitive surface of the image sensor. Examples of the image sensor include, but are not limited to, a charge-coupled device (CCD) image sensor, and a complementary metal-oxide-semiconductor (CMOS) image sensor.

Optionally, the image sensor is a video-see-through (VST) color camera sensor. The VST color camera sensor is configured to capture real time color video images of surrounding environment. The VST color camera sensor is configured to capture the real-world environment in various colours, enabling immersive and lifelike rendering within the XR or VR environment.

The term "processor" refers to a computational element that is operable to respond and process instructions that drive the apparatus. The processor may refer to one or more individual processors, processing devices, and various elements associated with a processing device that may be shared by other processing devices. Additionally, the one or more individual processors, processing devices, and elements are arranged in various architectures for responding to and processing the instructions that drive the processor. Examples of the processor may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The image sensor is configured to capture the input image with one or more textual features. The term "textual features" refers to elements or characteristics within the input image or visual content that are related to text. The one or more textual features includes components, patterns, or details in the input image that involve written or printed words, characters, symbols, or any form of textual information. The one or more textual features are present in the unreadable or distorted form. In other words, the one or more textual features are not recognizable due to various factors, such as poor image quality, distortion, or other forms of degradation. The unreadable form may be due to any reason including poor legibility, low resolution, heavy blurring, excessive noise, and the like in the input image. The distorted form may include geometric distortions (i.e., skewed or warped appearance of text due to viewing angles), digital or compression artifacts and the like. Such unreadable or distorted form of the one or more textual features causes problem while comprehending the actual meaning conveyed through the one or more textual features.

Optionally, the input image is a blurred image due to one of: long exposure, noise or motion of a user in a field of view of the image sensor during capture of the input image. The long exposure involves leaving a shutter of the image sensor open for an extended period. During the long exposure, any movement or changes in objects of the real-world environment can result in blurriness. The movement of objects may cause streaks or smudges in the input image, leading to a loss of detail and sharpness. The noise is generated due to random variations in pixel values of the input image. The noise may make the input image appear grainy and reduce overall clarity of the input image.

Optionally, the input image has a resolution below a resolution limit of the VST color camera sensor of the apparatus. The term "resolution limit" refers to a minimum level of detail or clarity that the image sensor is capable of capturing and processing effectively. In other words, the resolution limit defines the lowest resolution (in terms of pixels) at which the image sensor provides a usable or acceptable image quality. In an implementation, due to lower resolution of the input image in comparison to the resolution limit of the VST color camera sensor, the one or more textual features of the input image are not in the readable form.

The term "glyph" refers to an individual character or symbol in a writing system, which can include letters, numerals, punctuation marks, or any other distinct graphic representation used in written or printed language. In other words, the plurality of glyphs is a combination of letters, characters, numerals and/or symbols, which are indicative of a specific meaning. Examples of the glyph may include, but are not limited to, ENG (which represents engine in airplane cockpit), mph (which represents miles per hour in a speedometer), Hb (which represents haemoglobin in medical industry), and the like.

In operation, the processor is configured to detect the one or more textual features of the input image provided by the image sensor. In an example, the processor may be configured to implement techniques such as text detection algorithms, edge detection technique, feature extraction and classification, and the like, to detect the one or more textual features. After detecting the one or more textual features, the processor is configured to execute the neural network to concurrently deduce the plurality of glyphs that form one or more relevant words or abbreviations based on the detected one or more textual features of the input image. For example, the glyphs "E", "N" and "G" when used together in same sequence "ENG" indicates a word "engine", which is used in aircraft as well as in automotive industry. The neural network is configured to "concurrently" deduce the plurality of glyphs, that is to detect multiple glyphs at once in the input image. For example, the input image includes multiple glyphs representing relevant words or abbreviations. The processor (more specifically the neural network) is configured to detect all the glyphs present in the input image (based on the textual features) at one time and identify the glyphs that form combination of words or abbreviations related to meaningful words. For example, the input image is a medical prescription with handwritten and printed text, which is in a distorted form. The processor (more specifically the neural network) is configured to detect all the glyphs in the input image simultaneously based on the textual features. Conventionally, optical character recognition (OCR) technique is being used in XR headsets, which detect a single glyph in the input image and provides the output in form of probabilities for various possibilities of the single glyph, whereas the processor in the present disclosure is configured to detect multiple glyphs at once, forming a word, thereby significantly reducing the processing time and enables obtaining fast accurate and reliable results as compared to the conventional XR headsets.

The meaning associated with a specific glyph or a combination of glyphs is dependent on a use case scenario. The use case scenario refers to a specific situation or context in which the plurality of glyphs are used to convey a particular meaning or information. The meaning of a specific glyph or combination of glyphs in one use case scenario may be different from another use case scenario. For example, the combination of glyphs "ALT" is having meaning "Altitude" in airplane cockpit switch, whereas in medical field, the same combination of glyphs "ALT" means "Alanine Aminotransferase", an enzyme found in lever.

Optionally (in order to define the meaning of the plurality of glyphs), the processor is configured to detect the use case scenario based on the one or more textual features of the input image. In other words, the processor is configured to recognize the use case scenario by analyzing the textual features within the input image and deduce the context associated with the input image. Optionally, the detection of the use case scenario includes performing a semantic analysis of the one or more textual features in the input image. The term "semantic analysis" refers to a process of comprehending the meaning and context of words, phrases, and textual content. In an implementation, the processor is configured to perform semantic analysis by implementing multimodal large language models (LLMs) to detect the use case scenario from the input image. For example, the image sensor receives the input image with the one or more textual features and transmits the input image to the processor. The processor is configured to execute various LLM techniques by use of the neural network for detecting textual features and visual data (such as colour combination, shapes and the like, within the input image) and to identify the use case scenario associated with the input image. The semantic analysis enables deeper understanding of not only the one or more textual features but also the relationships, context, and subtleties between the one or more textual features, which allows precise identification of the use case scenario.

After identifying the use case scenario, the processor is configured to execute the neural network to identify the glyphs that, when combined, form meaningful words or abbreviations used in the corresponding use case scenario. The neural network analyzes the textual features in the input image, identifying patterns and connections between the glyphs. For example, the processor (through the neural network) may be configured to recognize that "A" followed by "L" and "T" forms the word "ALT," which might be an abbreviation for "Altitude" in one use case scenario (airplane cockpit dashboard). After deducing the plurality of glyphs, the processor is configured to correlate the identified glyphs (or combination of glyphs) with meaningful words used in the identified use case scenario. For example, the combination of glyphs "ECG" relates to the word "electrocardiograph", which is commonly used in medical use case scenario. The correlation between the identified glyphs and corresponding meaningful words is based on a training dataset used in training of the neural network.

Optionally, the neural network is trained using a domain specific vocabulary or a set of words that are used for each use case scenario of a plurality of different use case scenarios. The neural network is pretrained with the data set of plurality of use case scenarios, for example, medical equipment, automotive equipment, robots, stock market charts and the like. This vocabulary includes words and terms that are directly related to the use case scenario. The processor is configured to correlate the one or more relevant words or abbreviations (which are in distorted form) detected in the input image with actual words used in corresponding use case scenario. For example, the processor is configured to identify the use case scenario as "airplane cockpit dashboard" and the glyphs "ENG" are associated with word "engine", "ALT" is associated with word "altitude", and "ALT-HOLD" is associated with word "altitude hold" (which are used as standards in the airplane cockpit dashboard).

After identifying the meaningful words associated with the plurality of glyphs, the processor is further configured to generate the output image with enhanced one or more textual features in the legible form based on the deduced plurality of glyphs. In other words, the processor is configured to reconstruct the one or more textual features, which were initially in the distorted form, into the legible form that relates to the identified meaningful words. For example, the distorted form of "ALT" is converted into a clear and visible form to indicate the meaning "Altitude". Due to enhancement of the one or more textual features, the plurality of glyphs present in the output image appear more reliable as compared to the plurality of glyphs in the input image. Optionally, the neural network is configured to identify a meaning of a symbol, a letter, an abbreviation present as a part of the enhanced one or more textual features in the output image based on the detected use case scenario. In an example, the detected use case scenario may be "aviation". In such use case scenario, the neural network identifies that the glyphs "FLT" which represents flight, the glyphs "ENG" in the context of aviation may stand for "Engine," and the like.

The present disclosure also relates to the method as described above. Various embodiments and variants disclosed above, with respect to the aforementioned apparatus, apply mutatis mutandis to the method.

Optionally, the image sensor is a video-see-through (VST) color camera sensor.

Optionally, the input image has a resolution below a resolution limit of the VST color camera sensor of the at least one apparatus.

Optionally, the input image is a blurred image due to one of: long exposure, noise or motion of a user in a field of view of the image sensor during capture of the input image.

Optionally, the method comprises detecting a use case scenario based on the one or more textual features of the input image.

Optionally, the method comprises detecting the use case scenario comprises performing a semantic analysis of the one or more textual features in the input image.

Optionally, the method comprises training the neural network using a domain specific vocabulary or a set of words that are used for each use case scenario of a plurality of different use case scenarios.

The aforementioned steps are only illustrative and other alternatives can also be provided where one or more steps are added, one or more steps are removed, or one or more steps are provided in a different sequence without departing from the scope of the claims herein.

DETAILED DESCRIPTION OF THE DRAWINGS

Referring FIG. 1, illustrated is a block diagram of an apparatus 100 of image processing to enhance textual features present in an output image 106, in accordance with an embodiment of the present disclosure. The apparatus includes an image sensor 112 and a processor 114. The image sensor 112 is configured to capture an input image 102 with one or more textual features 104. Further, the processor 114 is configured to detect the one or more textual features 104 of the input image 102. The processor 114 is further configured to execute a neural network 116 to concurrently deduce a plurality of glyphs that form one or more relevant words or abbreviations based on the detected one or more textual features of the input image 102. The processor 114 is further configured to generate the output image 106 with enhanced one or more textual features 108.

Figure 2:
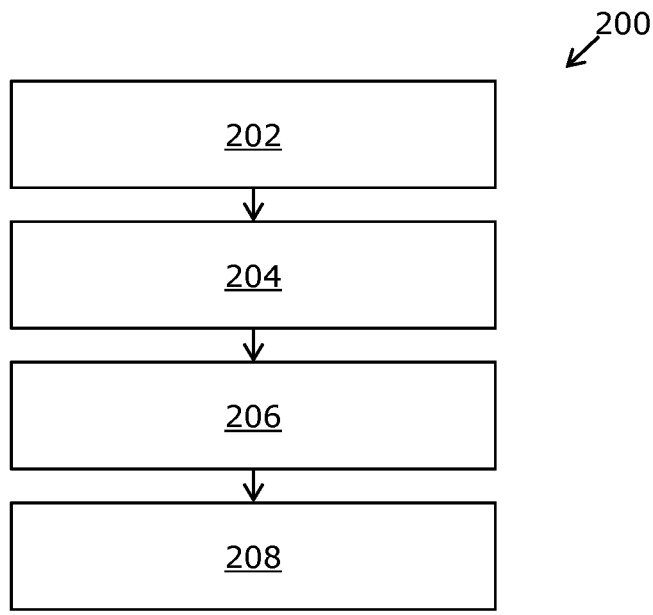
FIG. 2 illustrates steps of a method of image processing to enhance textual features in an output image, in accordance with an embodiment of the present disclosure.

FIG. 2 illustrates steps of a method 200 of image processing to enhance textual features in an output image, in accordance with another embodiment of the present disclosure. At step 202, the method 200 includes obtaining the input image 102 with one or more textual features 104. The one or more textual features 104 are present in an unreadable or distorted form. At step 204, the method 200 includes detecting the one or more textual features 104 of the input image 102. At step 206, the method 200 includes executing the neural network 116 to concurrently deduce a plurality of glyphs that form one or more relevant words or abbreviations based on the detected one or more textual features of the input image 102. At step 208, the method 200 includes generating an output image 106 with enhanced one or more textual features 108 in a legible form based on the deduced plurality of glyphs.

Figure 3:
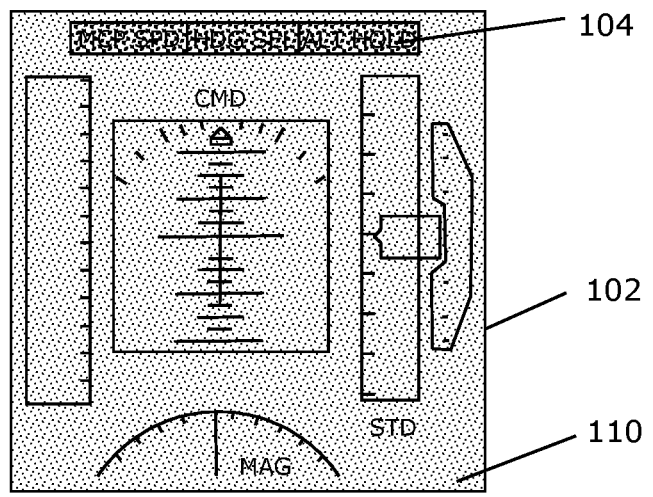
FIG. 3 is an illustration of an exemplary use case scenario associated with the apparatus of image processing to enhance textual features in an output image, in accordance with an embodiment of the present disclosure.
Figure 3:
Figure 3:
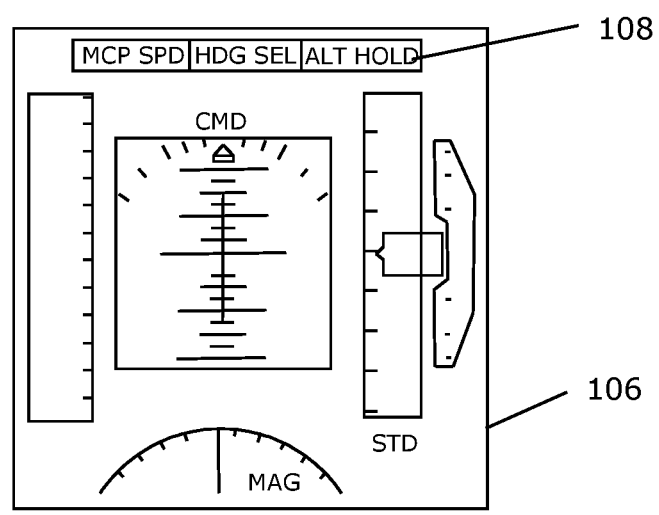

FIG. 3 is an illustration of an exemplary use case scenario associated with the apparatus of image processing to enhance textual features in an output image, in accordance with an embodiment of the present disclosure. In such example, the use case scenario is dashboard display of an airplane cockpit. The input image 102 is associated with the airplane cockpit dashboard display. The input image 102 includes one or more textual features 104 in an unreadable and distorted form. Further, the input image 102 also contains a noise 110 (indicated by shadings) which may be due to low sensor angular resolution of the image sensor 112 comprised by the apparatus 100. The processor 114 (of FIG. 1) is configured to detect the one or more textual features 104 of the input image 102. The processor 114 is further configured to execute the neural network 116 to concurrently deduce the plurality of glyphs, such as M, C, P, S, P, D, H, D, G, S, E, L, A, L, T, H, O, L, D, etc. that form one or more relevant words or abbreviations based on detected one or more textual features of the input image 102. The plurality of glyphs M, C, P form one relevant word "MCP", the glyphs S, P, D form one relevant word "SPD". Similarly, the glyphs H, D, G, S, E, L, A, L, T, H, O, L, D form relevant words, such as HDG, SEL, ALT HOLD respectively. Further, the processor 114 is configured to generate the output image 106 with enhanced textual features 108 that clearly indicate the words HDG, SEL, ALT HOLD and the output image 106 is free from the noise 110.

Figure 4:
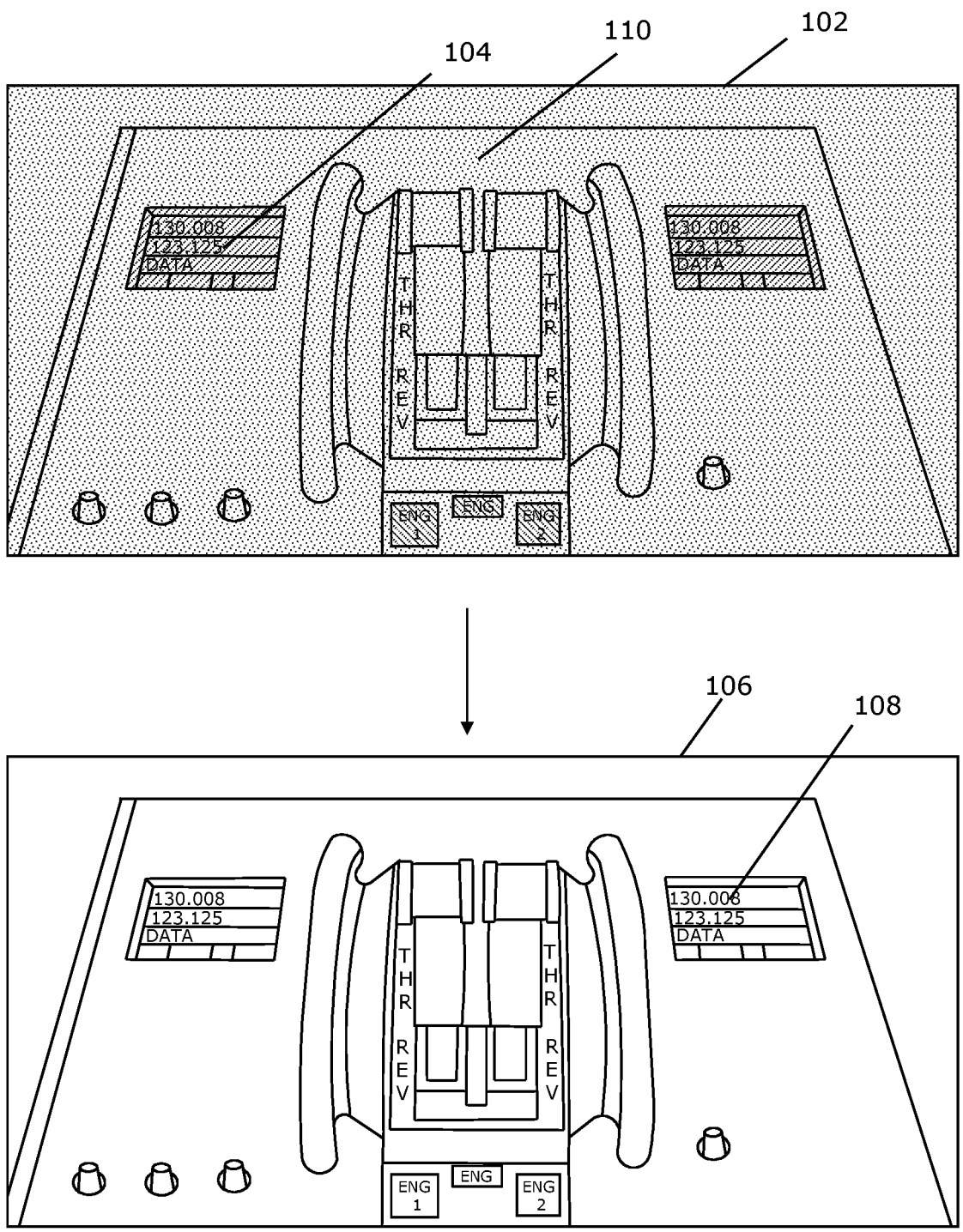
FIG. 4 is an illustration of an exemplary use case scenario associated with the apparatus of image processing to enhance textual features in an output image, in accordance with another embodiment of the present disclosure.

FIG. 4 is an illustration of an exemplary use case scenario associated with the apparatus 100 of image processing to enhance one or more textual features in the output image 106, in accordance with another embodiment of the present disclosure. In such example, the use case scenario is an airplane cockpit switchboard. The input image 102 is associated with the airplane cockpit switchboard. The input image 102 includes one or more textual features 104 which are present in an unreadable and distorted form. Further, the input image 102 also contains the noise 110 (indicated by shadings). The processor 114 (of FIG. 1) is configured to detect the one or more textual features 104 of the input image 102. The processor 114 is further configured to execute the neural network 116 to concurrently deduce the plurality of glyphs, such as 1, 3, 0, ., 0, 0, 8, 1, 2, 3, ., 1, 2, 5, D, A, T, A, E, N, G, 2, etc. that form one or more relevant words or abbreviations. The plurality of glyphs 1, 3, 0, ., 0, 0, 8 form one numerical value "130.008", and the plurality of glyphs 1, 2, 3, ., 1, 2, 5 form another numerical value "123. 125". Similarly, the glyphs D, A, T, A, E, N, G, 2 form relevant words, such as DATA, ENG 2, respectively. Further, the processor 114 is configured to generate the output image 106 with the enhanced one or more textual features 108 that clearly indicate the words 130.008, 123. 125, DATA, ENG 2 and the output image 106 is free from the noise 110.

The invention claimed is:

1. An apparatus, comprising:
   an image sensor to capture an input image with one or more textual features, wherein the one or more textual features are present in an unreadable or distorted form; and
   a processor configured to:
      detect the one or more textual features of the input image;

execute a neural network to concurrently deduce a plurality of glyphs that form one or more relevant words or abbreviations based on the detected one or more textual features of the input image and detect a use case scenario based on a context of the one or more textual features of the input image; and generate an output image with enhanced one or more textual features in a legible form based on the deduced plurality of glyphs.

2. The apparatus of claim 1, wherein the image sensor is a video-see-through (VST) color camera sensor.

3. The apparatus of claim 1, wherein the input image has a resolution below a resolution limit of the VST color camera sensor of the apparatus.

4. The apparatus of claim 1, wherein the input image is a blurred image due to one of: long exposure, noise or motion of a user in a field of view of the image sensor during capture of the input image.

5. The apparatus of claim 1, wherein the detection of the use case scenario comprises performing a semantic analysis of the one or more textual features in the input image.

6. The apparatus of claim 1, wherein the neural network is trained using a domain specific vocabulary or a set of words that are used for each use case scenario of a plurality of different use case scenarios.

7. The apparatus of claim 1, wherein the neural network is configured to identify a meaning of a symbol, a letter, an abbreviation present as a part of the enhanced one or more textual features in the output image based on the detected use case scenario.

8. A method of image processing implemented in at least one apparatus, the method comprising:

capturing an input image with one or more textual features, wherein the one or more textual features are present in an unreadable or distorted form;

detecting the one or more textual features of the input image;

executing a neural network to concurrently deduce a plurality of glyphs that form one or more relevant words or abbreviations based on the detected one or more textual features of the input image and detecting a use case scenario based on a context of the one or more textual features of the input image; and generating an output image with enhanced one or more textual features in a legible form based on the deduced plurality of glyphs.

9. The method of claim 8, wherein the image sensor is a video-see-through (VST) color camera sensor.

10. The method of claim 8, wherein the input image has a resolution below a resolution limit of the VST color camera sensor of the at least one apparatus.

11. The method of claim 8, wherein the input image is a blurred image due to one of: long exposure, noise or motion of a user in a field of view of the image sensor during capture of the input image.

12. The method of claim 8, wherein detecting the use case scenario comprises performing a semantic analysis of the one or more textual features in the input image.

13. The method of claim 8, further comprises training the neural network using a domain specific vocabulary or a set of words that are used for each use case scenario of a plurality of different use case scenarios.

* * * * *